US010925805B2

(12) United States Patent
Guilfoyle et al.

(10) Patent No.: US 10,925,805 B2
(45) Date of Patent: Feb. 23, 2021

(54) HEATING SYSTEM FOR SPA

(71) Applicant: Bullfrog International, LC, Bluffdale, UT (US)

(72) Inventors: Jeffrey J. Guilfoyle, San Diego, CA (US); Eric Hales, Eagle Mountain, UT (US)

(73) Assignee: Bullfrog International, L.C., Herriman, UT (US)

( * ) Notice: Subject to any disclaimer, the term of this patent is extended or adjusted under 35 U.S.C. 154(b) by 58 days.

(21) Appl. No.: 16/032,915

(22) Filed: Jul. 11, 2018

(65) Prior Publication Data

US 2020/0016029 A1 Jan. 16, 2020

(51) Int. Cl.
*A61H 33/00* (2006.01)
*G01K 7/22* (2006.01)
*G05B 15/02* (2006.01)

(52) U.S. Cl.
CPC .......... *A61H 33/0095* (2013.01); *G01K 7/22* (2013.01); *G05B 15/02* (2013.01); *A61H 2033/007* (2013.01); *A61H 2201/0207* (2013.01); *A61H 2201/0228* (2013.01); *A61H 2201/501* (2013.01); *A61H 2201/5082* (2013.01)

(58) Field of Classification Search
CPC ............... G05D 23/19; A61H 33/0095; A61H 2201/5082; A61H 2201/0207; A61H 2201/0228; A61H 2201/501; A61H 2033/007; A61H 33/005; A61H 33/063; A61H 2201/5071; A61H 2201/5023; A61H 1/00; G01K 7/22; G05B 15/02
USPC .......................................................... 700/300
See application file for complete search history.

(56) References Cited

U.S. PATENT DOCUMENTS 3,548,157 A * 12/1970 Lauck ................ G05D 23/1906
219/501
3,555,355 A * 1/1971 Pfister .................... H02H 3/085
361/27
3,813,927 A * 6/1974 Furgason ............... G01N 25/56
73/73
4,455,480 A * 6/1984 Matsumoto ............. A47J 27/62
219/442
(Continued)

FOREIGN PATENT DOCUMENTS

CN 102966765 A * 3/2013
GB 2290152 A * 12/1995 ............. A01G 25/16
(Continued)

OTHER PUBLICATIONS

Wang, Kai, et al. Thermoeconomic Assessment of a PV/T Combined Heating and Power System for University Sport Centre of Bari. vol. 158, 2019. Ei Compendex®. Web. Aug. 13, 2019. (Year: 2019).*

(Continued)

*Primary Examiner* — Jigneshkumar C Patel
(74) *Attorney, Agent, or Firm* — Dentons Durham Jones Pinegar; Sarah W. Matthews

(57) ABSTRACT

A system for heating a pool or spa. The system may include a circuit for interrupting the power supply to a heating element of the pool or spa. A thyristor may be used to vary the voltage supply to the heating element, such as by use of a variable resistor, capacitor, and a triac. The system may adjust the resistance on the variable resistor to control to voltage supply to the heating element, allowing a larger heating element to be used more efficiently.

19 Claims, 6 Drawing Sheets

(56) References Cited

U.S. PATENT DOCUMENTS

| | | | | |
|---|---|---|---|---|
| 4,675,874 A | * | 6/1987 | POhler | H01S 3/03 |
| | | | | 372/33 |
| 5,585,025 A | * | 12/1996 | Idland | G05D 23/1909 |
| | | | | 219/485 |
| 6,246,831 B1 | * | 6/2001 | Seitz | F24H 9/2021 |
| | | | | 219/483 |
| 6,355,913 B1 | | 3/2002 | Authier et al. | |
| 6,476,363 B1 | | 11/2002 | Authier et al. | |
| 6,633,726 B2 | * | 10/2003 | Bradenbaugh | F24H 9/2021 |
| | | | | 219/497 |
| 6,965,815 B1 | * | 11/2005 | Tompkins | G05D 23/1917 |
| | | | | 4/493 |
| 8,014,902 B2 | * | 9/2011 | Kates | E04H 4/129 |
| | | | | 4/490 |
| 2006/0162719 A1 | * | 7/2006 | Gougerot | A61H 33/005 |
| | | | | 126/374.1 |
| 2006/0238931 A1 | | 10/2006 | Cline et al. | |
| 2008/0041839 A1 | * | 2/2008 | Tran | H05B 1/0269 |
| | | | | 219/213 |
| 2009/0204263 A1 | * | 8/2009 | Love | G05D 23/19 |
| | | | | 700/282 |
| 2009/0255049 A1 | | 10/2009 | Rosenau | |
| 2013/0201316 A1 | * | 8/2013 | Binder | H04L 67/12 |
| | | | | 348/77 |
| 2014/0303757 A1 | * | 10/2014 | Pruchniewski | H04L 47/70 |
| | | | | 700/90 |
| 2015/0260428 A1 | * | 9/2015 | Haldeman | F24H 1/142 |
| | | | | 4/493 |
| 2017/0209338 A1 | * | 7/2017 | Potucek | A61H 33/005 |
| 2017/0211285 A1 | | 7/2017 | Potucek et al. | |
| 2019/0021944 A1 | * | 1/2019 | Hollaway | A61H 33/0095 |

FOREIGN PATENT DOCUMENTS

| | | | | |
|---|---|---|---|---|
| JP | 11344901 A | * | 12/1999 | |
| WO | WO-02053987 A2 | * | 7/2002 | F24H 9/2021 |
| WO | 2014-022843 A1 | | 2/2014 | |

OTHER PUBLICATIONS

Hlaing et al. Microcontroller-Based Single-Phase Automatic Voltage Regulator, 2010, IEEE, 222-226. (Year: 2010).*

Skinner et al. Using Smart Sensor Strings for Continuous Monitoring of Temperature Stratification in Large Water Bodies, Dec. 2006, IEEE Sensors Journal, vol. 6 No. 6, 1473-1481. (Year: 2006).*

Amin et al. Design of Microcontroller Based Thyristor Controlled Three-Phase Static Volt-Ampere Reactive Compensator, 2014, 3rd International Conference on Informatics, Electronics & Vision 2014, (Year: 2014).*

Machine Translation of JP-11344901-A (Year: 1999).*

Machine Translation of CN-102966765-A. (Year: 2013).*

USPTO as International Searching Authority, "International Search Report and Written Opinion", for application No. PCT/US2019/019835, dated Nov. 22, 2019.

* cited by examiner

HEATING SYSTEM FOR SPA

TECHNICAL FIELD

This disclosure relates generally to spas, and systems and methods for controlling the temperature thereof, and more specifically to a spa that regulates voltage supplied to the heating element and allows for network communications to control the heating element. The features disclosed herein are numerous in nature and may be utilized in a number of different ways to provide the same or similar power line communications control results.

RELATED ART

A spa's heating system typically comprises a heating element in a water circulating heating pipe system. As water circulates and passes by the heating element, the water is heated. A major problem associated with the spa's water circulating heating pipe system is the risk of damage to the heater and adjacent parts of the spa when the heater becomes too hot. The heater may become too hot if, for example, there is low or no water flowing past the heater.

Another problem associated with a spa's heating system is the achieving the balance between heating a spa quickly for use, and using energy efficiently. The current solution is to choose a heating element of the optimal size. Many spa systems use a relatively small heating element (4 kW or smaller) to save energy. However, this typical size has the drawback of not being able to heat water quickly for a user, while also causing an energy draw when the system is not actively heating the water in the spa for use. Use of a larger heating element (5.5 kW) may help to heat water more quickly, but causes an even larger energy draw when the system is not actively heating the water in the spa for use.

Spas may also be able to heat more efficiently when provided with a sufficient amount of time to heat, but this also depends highly on the ambient air temperature. The spa heating system and method disclosed herein takes into account the difficulty of determining the most energy efficient timing and power to heat a spa system, including known spa usage patterns and ambient temperature, while also allowing a network communication for the system to provide convenient control of the spa from a remote location.

SUMMARY

This disclosure, in at least one aspect, relates to a system and method for increasing the efficiency of a spa heating element by regulating the output voltage to the spa heating element from an input voltage, taking into account the desired temperature of the spa, the temperature of the heating element, and/or the ambient temperature. More generally, the system comprises a spa heating element in communication with a voltage regulator (VR) and a controller to regulate the input voltage to the heating element. The system may also include network communications to a client's device for remote control/access to settings, and/or data from a third party relating to energy efficiency, ambient temperature, etc.

The system may comprise a heating element in communication with a thermistor and controller; a capacitor in electrical communication with a voltage supply for the heating element; a variable resistor in electrical communication with the capacitor and the heating element; and a thyristor in electrical communication with the capacitor and the heating element. In some configurations, the thermistor is integral to the heating element. In some configurations additional sensors such as water temperature sensors and water flow sensors may be provided and in communication with a controller. In some configurations, the thyristor may comprise a triac or a quadrac in electrical communication with the capacitor and the heating element to control the voltage to the heating element.

According to another aspect, the system may achieve voltage control of the heating element through the use of an integrated circuit with a switch-mode power supply.

According to another aspect, the system comprises a network in communication with the controller, such that the controller may communicate with one or more of a client device and/or third party data via the network. The client may provide instructions to the controller regarding heating of the spa via a client device over the network. Similarly, the controller may communicate current and/or future settings to the client device over the network. The third party data may relate to the ambient temperature proximal to the spa, and/or electricity pricing data for the electricity source of the spa. Such third party data may be used by one or more modules on the controller to optimize heating of the spa, including reducing the electricity used as well as minimizing electrical costs.

In some configurations, the controller may be provided with one or more modules to optimize the heating of the spa. In one configuration, a VR adjusting module is provided, which may be configured to control a resistance on variable resistor in a variable voltage circuit to control the voltage to the spa heating element. In some configurations, a heating schedule module may be provided which may be configured to determine usage patterns for heating the spa. In some configurations, a weather data module may be provided which may be configured to receive data relating to an ambient temperature and determine optimal heating instructions for the spa. In other configurations, an electricity pricing module may be provided which may be configured to receive data relating to current and/or predicted future price of electricity and determine optimal heating instructions for the spa to minimize the cost to heat the spa.

According to another aspect, a method is provided for regulating the output voltage to a spa heating element from an input voltage. The method may comprise: providing a capacitor in electrical communication with the input voltage; providing a variable resistor in electrical communication with the capacitor and the spa heating element; providing a thyristor in electrical communication with the capacitor and the spa heating element; providing a controller in communication with the variable resistor; providing a thermistor in communication with the controller and the heating element; receiving, by the controller, at least one data point from a third party, the at least one data point relating to an air temperature proximal to a spa heating element; receiving, by the controller, a signal from the thermistor indicating the current temperature of the heating element; sending, by the controller, one or more signals to the variable resistor in response to the signal from the thermistor and the at least one data point relating to the air temperature proximal to the spa.

The method may further comprise the step of receiving, by the controller, at least one data point from a third party relating to a price of electricity for the power source proximal to the spa. The method may further comprise sending, by the controller, one or more signals to the variable resistor in response to the at least one data point relating to the price of electricity for the power source proximal to the spa.

There is a plurality of means and methods for achieving a spa heating system. Other aspects, as well as features and advantages of various aspects of the disclosed subject matter will become apparent to one of ordinary skill in the art from the ensuing description, the accompanying drawings and the appended claims.

BRIEF DESCRIPTION OF THE DRAWINGS

The following drawings illustrate what are currently considered to be specific representative configurations for carrying out the invention and are not limiting as to embodiments which may be made in accordance with the present invention. The components in the drawings are not necessarily to scale relative to each other. Like reference numerals designate corresponding parts throughout the several views. The drawings are illustrative and not limiting of the scope of the invention which is defined by the appended claims. The various elements of the invention accomplish various aspects and objects of the invention. Not every element of the invention can be clearly displayed in a single drawing, and as such not every drawing shows each element of the invention.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in a computer readable medium and so executed by a computer or processor, whether or not such computer or processor is explicitly shown.

FIG. 4 is a schematic diagram of a configuration of a variable voltage circuit which may be used to vary the voltage to the spa's heating element.

DETAILED DESCRIPTION

Figure 1:
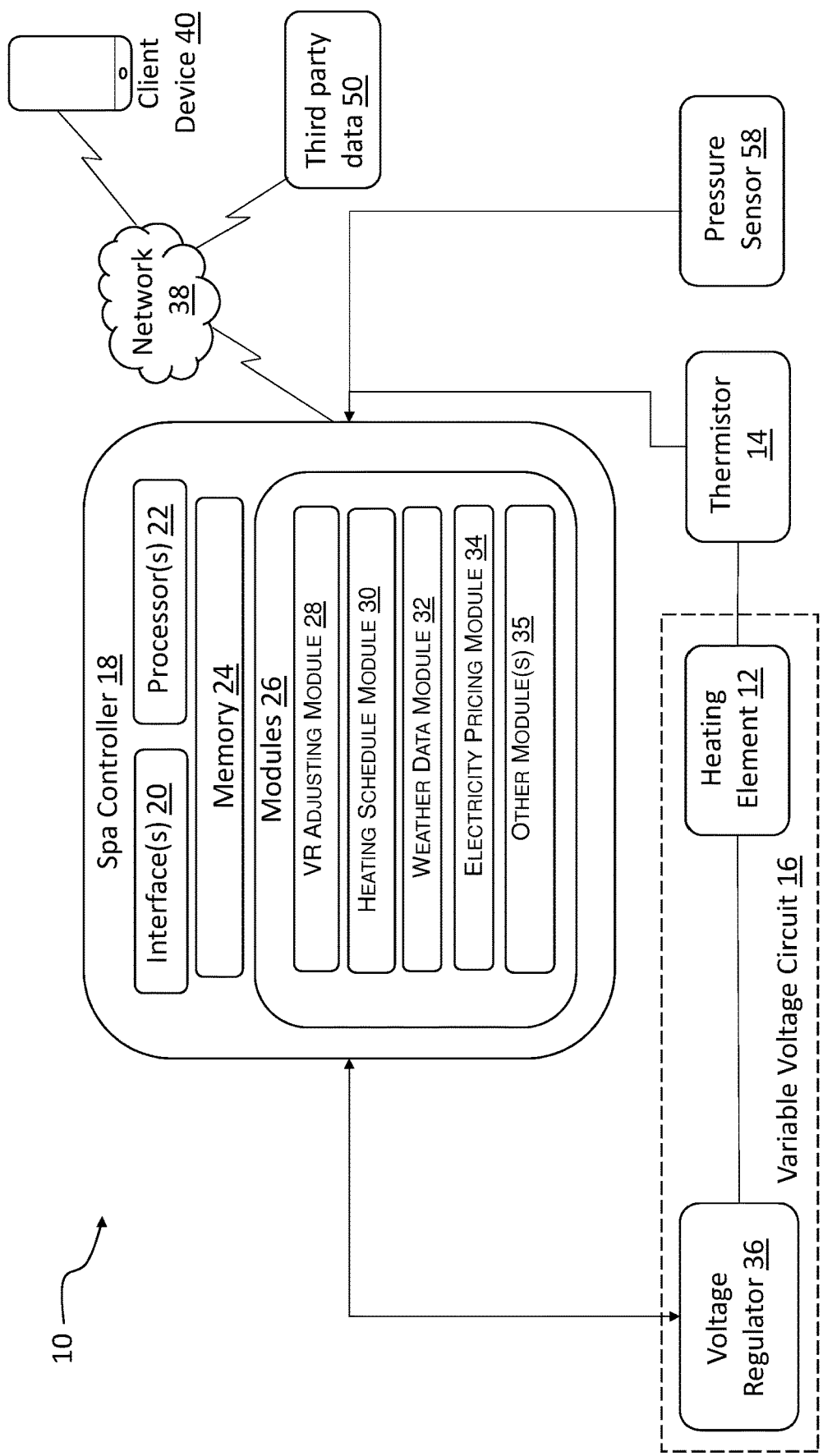
FIG. 1 is a schematic diagram of a configuration of a spa heating system.
Figure 2:
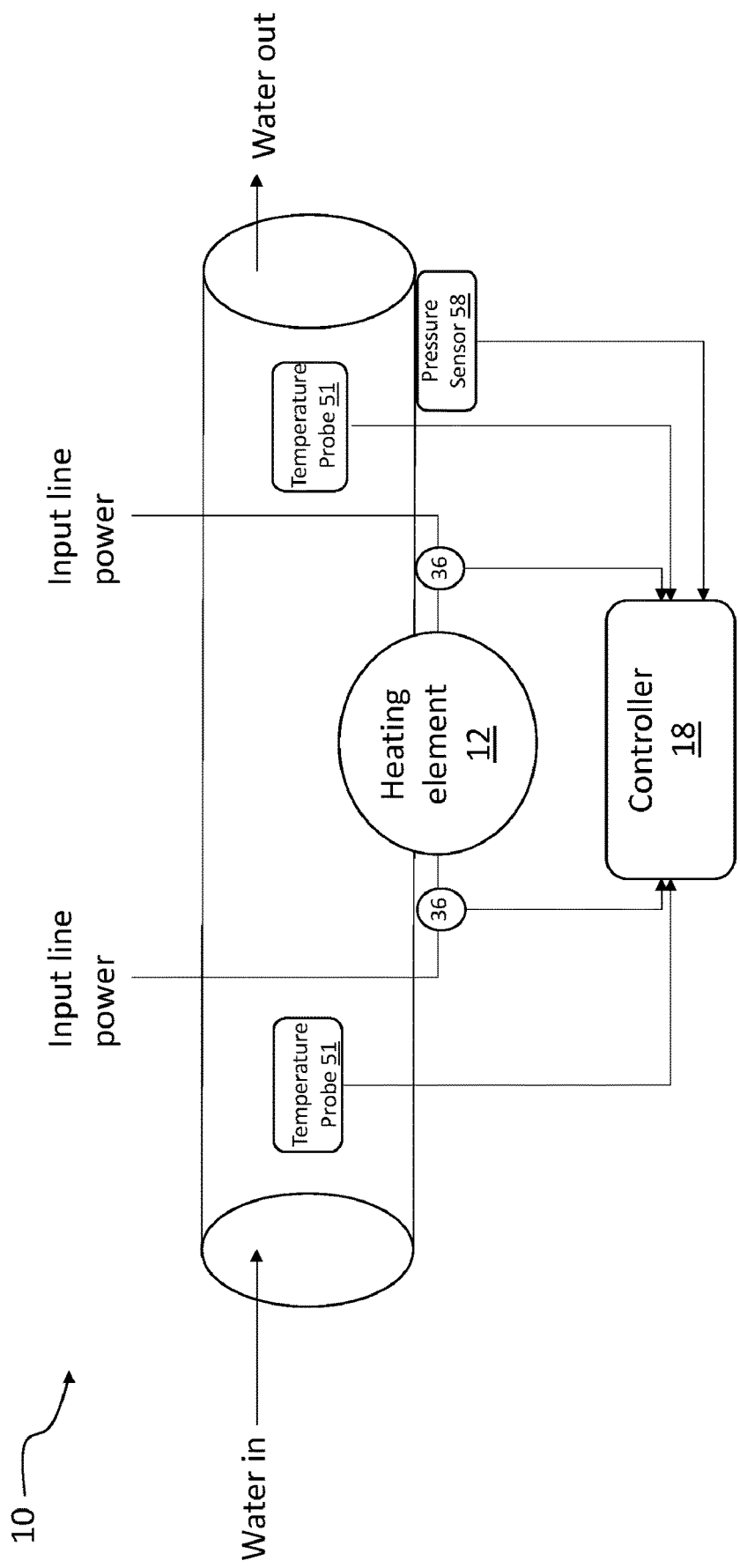
FIG. 2 is a schematic diagram of another configuration of a spa heating system.

FIGS. 1-2 illustrate schematic diagrams of various embodiments of a heating system 10 for utilization in a spa or pool. The heating system may generally comprise a heating element 12 comprising a thermistor 14, and a circuit, generally indicated at 16, for varying the voltage provided to the heating element. While the circuit is generally referred to as a variable voltage circuit herein, it will be appreciated that the circuit can be formed several different ways to vary the voltage supplied to the heating element. A microprocessor may be in communication with the thermistor, and a microcontroller/processor may be in electrical communication with the circuit to vary the voltage to the heating element. It will be appreciated that the microprocessor may be located at the thermistor, at a spa controller 18, or any suitable combination.

A spa controller 18 may include one or more interfaces 20, processor(s) 22, and memory 24. The spa controller may also be programmed with one or more modules 26 to perform the functions described herein. For example, a VR adjusting module 28, a heating schedule module 30, a weather data module 32, an electricity pricing module 34, and/or other modules 35 may be provided as described in more detail below. In addition to being in communication with the variable voltage circuit 16, heating element 12, and/or thermistor 14, the spa controller 18 may also be in communication with a network 38 that is in communication with one or more client devices 40 and/or third party data 50, as described in more detail below For a firmware, and/or software implementation, the methodologies can be implemented with modules (e.g., procedures, functions, and so on) that perform the functions described herein. Any machine readable medium tangibly embodying instructions can be used in implementing the methodologies described herein. For example, software codes and programs can be stored in a memory and executed by a processing unit. Memory can be implemented within the processing unit or may be external to the processing unit. As used herein the term "memory" refers to any type of long term, short term, volatile, nonvolatile, or other storage devices and is not to be limited to any particular type of memory or number of memories, or type of media upon which memory is stored.

In another firmware and/or software implementation, the functions may be stored as one or more instructions or code on a non-transitory computer-readable medium. Examples include computer-readable media encoded with a data structure and computer-readable media encoded with a computer program. Computer-readable media may take the form of an article of manufacturer. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store reproduced data magnetically, while discs reproduce data optically with lasers. Combinations of the above should also be included within the scope of computer-readable media. FIG. 8;

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are intended to be only for pedagogical purposes to aid the reader in understanding the principles of the invention and the concepts contributed by the inventor(s) to further the art. All examples are to be construed as being without limitation to such specifically recited examples and conditions. Moreover, all statements herein reciting principles, aspects, and embodiments of the invention, as well as specific examples thereof, are intended to encompass equivalents thereof.

The manner in which the systems and methods may be implemented is explained in details with respect to the figures. While aspects of described systems and methods can be implemented in any number of different computing systems, transmission environments, and/or configurations, the embodiments are described in the context of the following exemplary system(s).

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. Additionally, the word "connected" and "coupled" is used throughout for clarity of the description and can include either a direct connection or an indirect connection.

FIG. 1 shows elements of the spa heating system, including the heating element 12 in communication with the controller 18, the thermistor 14 in communication with the controller 18, and the variable voltage circuit 16 in communication with the controller 18. The thermistor 14 may be any suitable type of thermistor known in the art, for example, NTC thermistors, thermocouples, etc. The thermistor 14 may be integral to the heating element 12, or the thermistor 14 may be formed proximal to the heating element. The thermistor 14 may allow the system to determine the current temperature of the heating element 12, and also track the temperature of the heating element over time. For example, if the thermistor 14 indicates that the temperature of the heating element 12 is rapidly increasing, it could be indicative that there is no water flow past the heating element 12 and the controller 18 could take steps to prevent damage to the heating element (such as an auto shut-off for the heating element, a signal sent to a client device 40, etc.).

The thermistor 14 may also be in communication with the spa controller 18, such that the spa controller may be able to gather data from the thermistor 14. The spa controller 18 may then be programmed to take actions based on the data, for example, through use of the VR adjusting module 28. The VR adjusting module may be programmed to adjust one or more elements of the variable voltage circuit 16 to control voltage supplied to the heating element 12. For example, if the controller 18 receives a signal from the thermistor that indicates the heating element 12 is lower than a predetermined desired temperature, the VR adjusting module 28 of the controller 18 may be programmed to send a signal to the variable voltage circuit 16 to increase the voltage being sent to the heating element (see FIG. 2, described below). A voltage regulator 36 may comprise any suitable voltage regulator known in the art.

The system may also comprise a network 38 for connection of the spa controller 18 to a client device 40 and/or third party data 50. The client device 40 may be used to send heating instructions to the spa controller. For example, if a spa user decides they want to use the spa at a particular time, they may send a signal to the spa controller 18 through one or more applications via network 38. Such instructions may include a particular temperature the spa should reach at a desired time. Similarly the spa controller may be connected via the network 38 to one or more sets of third party data 50. Such data may include, for example, data relating to the weather, ambient air temperature proximal to the spa, data relating to the current price of electricity for the voltage source of the spa, data relating to the predicted future price of electricity, etc. The spa controller 18 may use such third party data 50 to further increase the efficiency of the heating of the spa.

FIG. 2 shows another view of a system used to regulate a spa's heating element 12. In this system, temperature probes 51 may be provided to measure the temperature prior to contact with the heating element and after contact with the heating element. A pressure sensor 58 may also be provided in connection with a heat system to measure the water flow. One with skill in the art will appreciate any suitable type of sensor capable of measuring water flow, etc., may be used. Where water flow is too low, the heating element may heat too quickly and cause damage to the heating element and other systems of the spa. Where there are no pressure sensors to estimate water flow, the system may use the thermistor in connection with the heating element to infer water flow. Where the temperature of the heating element 12 remains fairly constant, the system may be programmed to infer water flow past the heating element 12.

Figure 3:
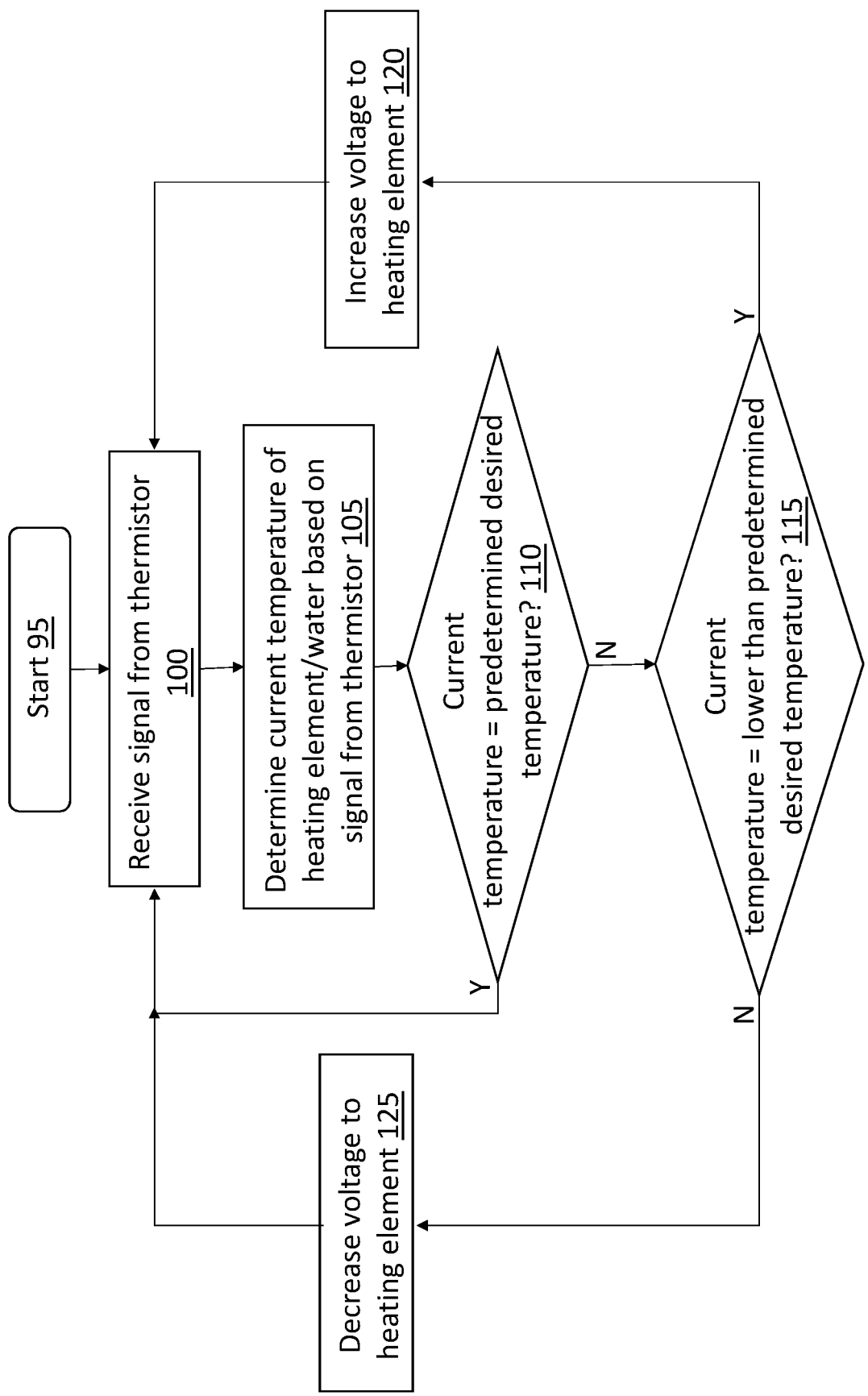
FIG. 3 is a flowchart illustrating a configuration of a method in which the voltage to the spa's heating element may be adjusted.

An exemplary algorithm that may be performed by the controller 18 and/or VR adjusting module 28 is shown in FIG. 3. After a start (95), the controller 18 may receive a signal from the thermistor 14 (100). The controller 18 may, through the VR adjusting module 28 or otherwise, determine a current temperature of the heating element 12 based on the signal received from the thermistor (105). In other configurations (see FIG. 2) with a separate temperature probe 51 for the water heated by the heating element 12, the controller 18 may determine a current temperature of the water proximal to the heating element 12. The controller 18 may, through the VR adjusting module 28 or otherwise, query to determine if the current temperature (of either the heating element 12 or the water proximal to heating element 12 as measured by temperature probe 51) is equal to a predetermined desired temperature (110). The predetermined desired temperature may be programmed into the heating schedule module 30 and stored on a memory 24, may be determined by a user selecting a predetermined desired temperature via an interface 20, may be determined by a user selecting a predetermined desired temperature via a client device 40 in communication with the controller 18 via a network 38, may be determined based on third party data 50 such as weather data, or by any other suitable means.

Where the current temperature is equal to the predetermined desired temperature, the algorithm may loop back to receive a signal from thermistor 14 (100) without making adjustments to the voltage sent to the heating element 12. Where the temperature is not equal to the predetermined desired temperature, the algorithm may query if the current temperature is lower than the predetermined desired temperature (alternatively, it is appreciated the algorithm may query if the current temperature is higher than the predetermined desired temperature) (115). Where the current temperature is lower than the predetermined desired temperature, the algorithm may send a signal to increase the voltage to the heating element 12 (120), then the algorithm may loop through again to receive a signal from the thermistor (100). Wherein the current temperature is not lower than the predetermined desired temperature (that is, where the current temperature is higher), the algorithm may be programmed to send a signal to decrease the voltage to heating element 12 (125), and then continue the loop to receive a signal from the thermistor (100). The steps of FIG. 3 need not be taken in the specific order shown and one or more steps may be taken at the same time.

The various modules 26 on the spa controller 18 may increase the energy efficiency of the spa's heating system. For example, the heating schedule module 30 may be programmed to analyze and "learn" the heating patterns of users. If users tend to use the spa at a specific time of day, the heating schedule module 30 may allow the spa to warm up to the desired temperature more slowly and efficiently to achieve the correct temperature by the specific time of day the users tend to use the spa. Similarly, if users tend to use the spa on weekends, the heating schedule module 30 may allow the spa to keep at a cooler, more energy efficient temperature automatically during the week, and warm up to a desired use temperature in an energy-efficient manner in anticipation of the weekend use. The weather data module 32 may retrieve third party data 50 relating to the ambient temperature to determine the most energy efficient holding temperature of the spa while it is not in use.

An electricity pricing module 34 may also be provided to decrease the cost to heat the water in the spa. For example, an electricity pricing module may allow the controller to retrieve third party data 50 relating to the current price of electricity per kilowatt-hour. Similarly, the data may relate to the predicted future price of energy per kilowatt-hour. The electricity pricing module 34 may determine, based on the third party data 50, as well as data from the heating schedule module 30 and/or instructions regarding heating from a client device 40, the optimal time to heat the spa. For example, if according to the heating schedule module 30, the spa needs to increase by TO degrees over the next 5 hours, the electricity pricing module may obtain data relating to the cost of electricity per kilowatt-hour over the next five hours and determine the best time to heat the spa. For example, if the price of energy is currently low, but is predicted to increase, the electricity pricing module may determine that the spa should be heated immediately (which requires a greater electricity draw) and then the heat be maintained (which requires less electricity draw). Conversely, if the price of electricity is currently high, but is predicted to decrease, the electricity pricing module may determine that the spa should not be heated until closer to the time that the spa will be in use. Other modules 35 may be provided as desired to control the heating element and such are anticipated as being within the scope of this disclosure.

The heating schedule module 30 may be used to provide default heat settings to controller 18, which may be overridden by user who may desire to use the spa outside the pattern established by the heating schedule module 30. For example, a user can direct the controller 18, via interface 20, to heat the spa. Similarly, a user may direct the controller 18 through an interface provided on a client device 40 and through network 38, to heat the spa. When such a heating direction is given, it may be given with a directive to heat the spa in a certain amount of time. For example, if a user immediately wants to use the spa, an immediate increase in the heat may be required. Thus, a larger voltage may be sent to the heating element 12 to quickly heat the water. Because the voltage to the heating element 12 may be varied, a larger heater can be used effectively to maintain a lower temperature (wherein a lower voltage is applied to the heating element 12) and also be used effectively to quickly heat the water (wherein a larger voltage is applied to the heating element 12). For example, typical spa heating elements may be 2 kW, 4 kW, 4.5 kW, or 5.5 kW. Using a larger 5.5 kW heater where a smaller 4 kW heater is typically used will allow for faster heating when wanted. However, a larger 5.5 kW heating element would typically have the drawback of being less energy efficient when the spa is not being actively heated. But according to the disclosure herein, the 5.5 kW heater could be regulated through the use of the variable voltage circuit 16 to lower the power to 2 kW or similar for a slower heating cycle using less power over a longer time.

Figure 4:
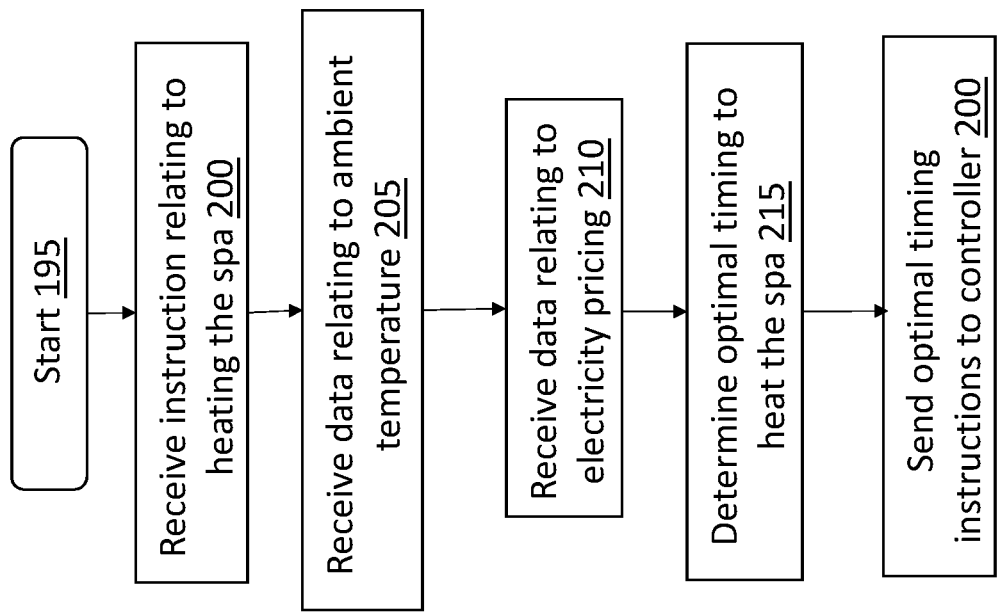
FIG. 4 is a flowchart illustrating a configuration of a method in which the voltage provided to the heating element may be optimized based on the ambient temperature and the pricing of electricity.

FIG. 4 shows a flowchart of steps which may be taken on the various modules 26 of the controller 18 in order to optimize the heating of the spa's water by controlling voltage to heating element 12. For example, after a start (195), the system may receive an instruction relating to heating of the spa (200). This instruction may come from various sources. For example, the instruction may come from a user inputting a specific instruction relating to a temperature and a time from a client device 40 over network 38, or on an interface 20 on the controller 18. The instruction may come directly from the heating schedule module 30, based on the prior history of usage of the spa in the past. After the heating instruction is received, the spa controller may receive data relating to an ambient air temperature proximal to the spa (205). The weather data module 32 may use such data to determine an amount of time it will take the spa to achieve the temperature desired by the desired time. For example, during colder weather, it may take longer to achieve the desired temperature and the weather data module 32 may take the ambient temperature into consideration and send appropriate instructions to the controller 18.

The system may then receive data relating to electricity pricing (210) from a third party data source 50. For example, the electricity pricing module 34 may receive data from a third party 50 over network 38 relating to the present cost of electricity for the electricity source of the spa. The electricity pricing module 34 may also receive data from a third party 50 over network 38 relating to the predicted future price of electricity for the spa's electricity source, such as the predicted price for each hour over the next 12 hours. In other configurations, the electricity pricing module 34 may store such pricing on memory 24 and compile its own predictions relating to future pricings. Based on the current and predicted future pricing of electricity, as well as the instructions received (at step 200), the electricity pricing module 34 may send instructions to the controller 18 to optimize the timing to heat the spa.

The various modules may receive instructions and/or third party data, and, based on such instructions/third party data, determine the optimal timing to heat the spa (215). The instructions for the optimal heating time for the spa may then be sent to controller 18, and the controller may execute such instructions, for example, through the VR adjusting module 28. It will be appreciated the steps of FIG. 4 need not be taken in the specific order shown and one or more steps may be taken at the same time. Similarly, the steps may be taken multiple times per second and the optimal timing determination (215) may be nearly continuously updated in response to changing instructions and/or third party data.

Figure 5:
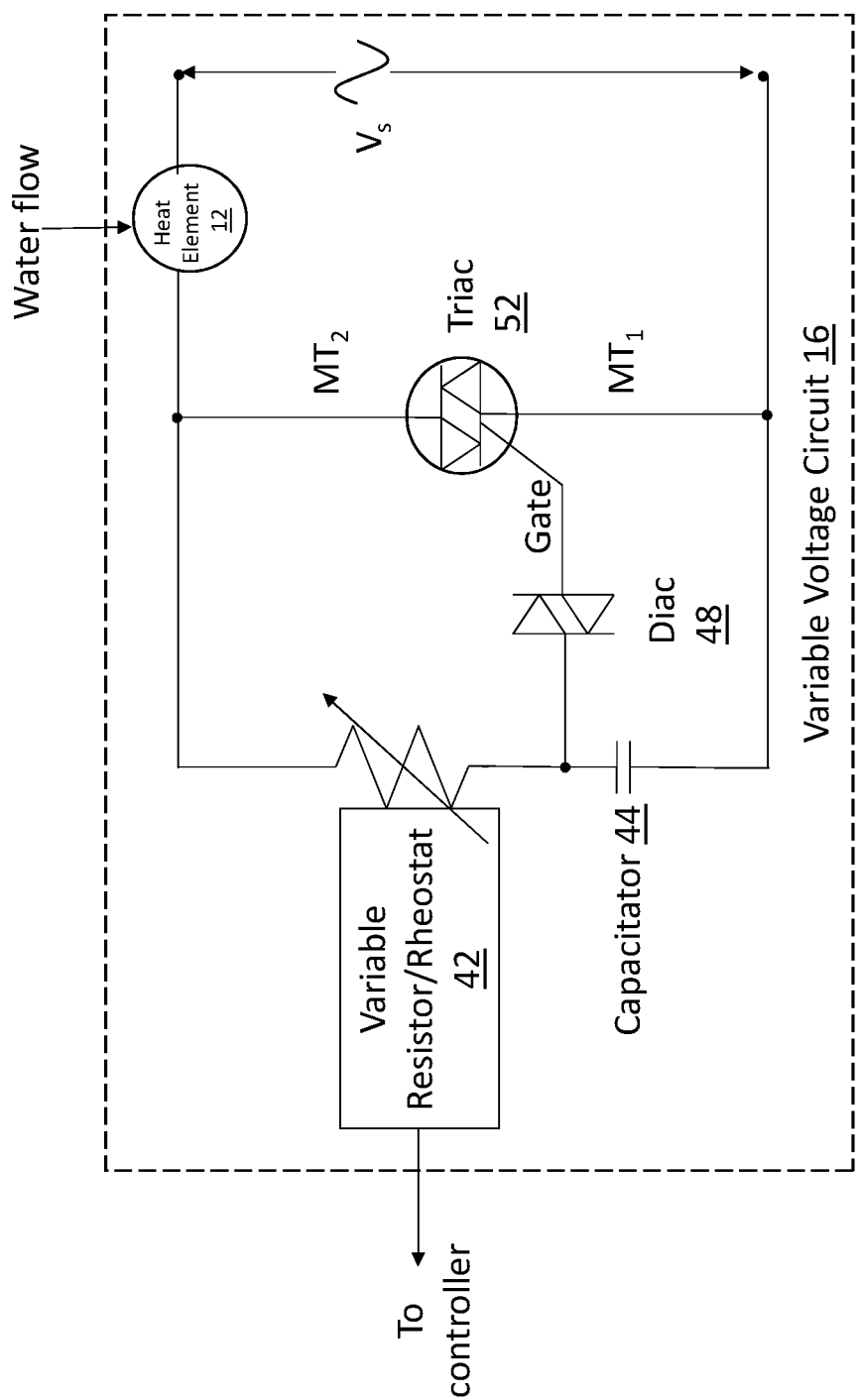
FIG. 5 is a schematic diagram of another possible configuration of a variable voltage circuit which may be used to vary the voltage to the spa's heating element.
Figure 6:
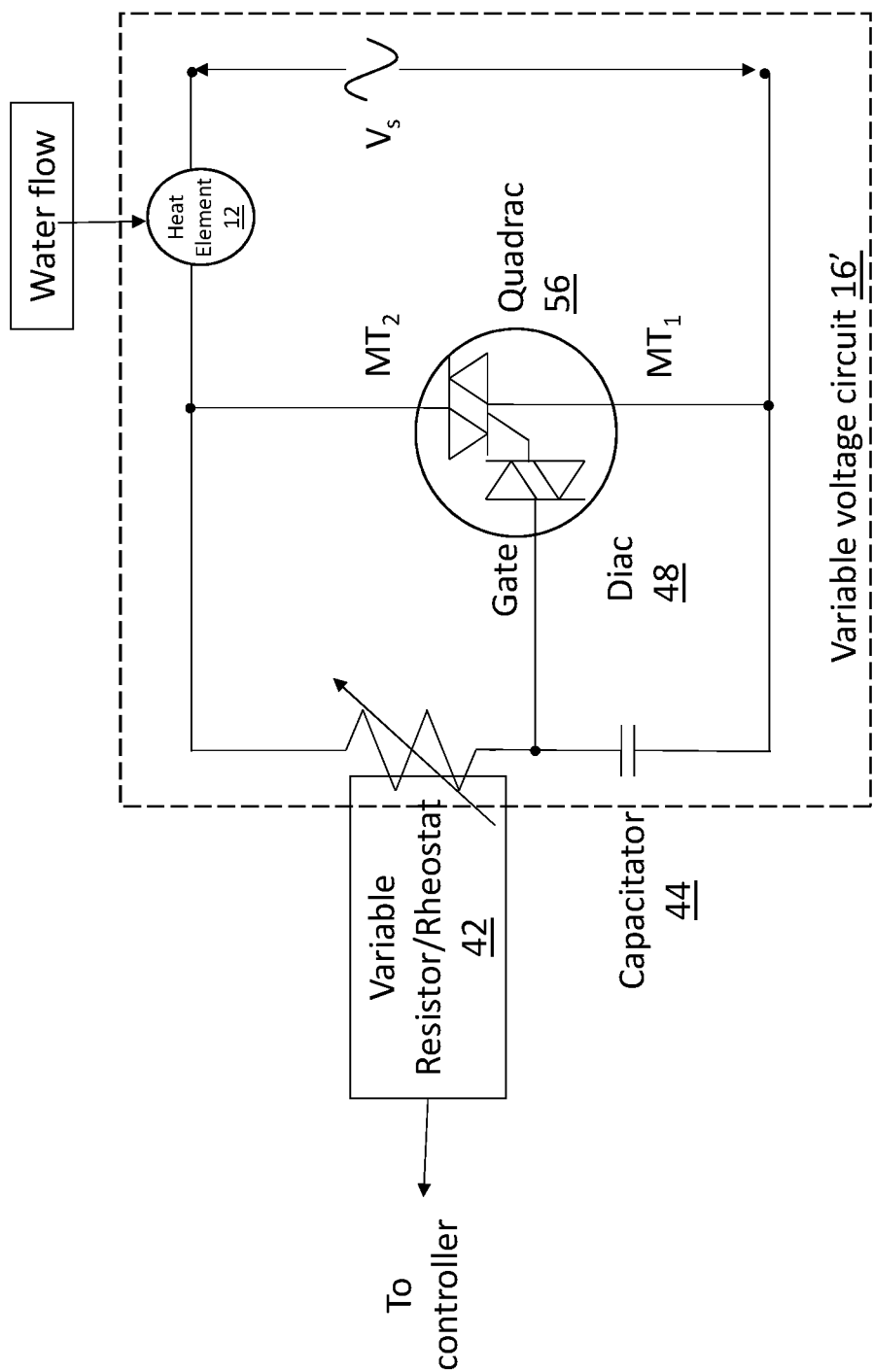
FIG. 6 is a schematic diagram of another possible configuration of a quadrac which may be used to vary the voltage to the spa's heating element.

The mechanism for controlling the variable voltage circuit 16 may be any suitable mechanism known in the art. FIGS. 5-6 show various configurations for variable voltage circuits which are contemplated. For example, the variable voltage circuit 16 may comprise any suitable circuit to vary the voltage applied to a load (in this case, the heating element 12) known in the art. A voltage regulator may comprise any suitable voltage regulator known in the art. In some configurations, the voltage regulator comprises a variable resistor/rheostat 42. The variable resistor may be in direct communication with the spa controller 18, and the variable resistor may receive signals from the spa controller 18, such as signals to increase the voltage (120 in FIG. 3 or decrease the voltage (125 in FIG. 3).

According to one configuration shown in FIG. 5, the variable voltage circuit comprises a capacitor 44, a variable resistor 42, a diac 48, and a triac 52, in electrical communication with the heating element 12. The capacitor 44 may be in electrical communication with the voltage supply, such AC from the mains power supply. The variable resistor 42 may be in electrical communication with the capacitor 44 and heating element 12, and also connected to the controller 18 to receive signals from the controller 18 (for clarity, the controller is not shown in FIG. 5). The variable resistor 42 may be any suitable variable resistor known in the art.

The variable resistor 42, or variable potentiometer, may be adjusted to change the output resistance value based on instructions received from the controller 18. For example, when the controller receives a signal from the thermistor 14 indicating the temperature of the heating element 12 is not as high as it should be (or a signal from a temperature probe 51 in FIG. 2 indicating the temperature of the water is not as high as it should be), the controller 18 may, through the VR adjusting module 28, send a signal to the voltage regulator 36 comprising the variable resistor 42, to increase the voltage being sent to the heating element 12 (for example, in step 120 of FIG. 3 where the algorithm sends a signal to increase the voltage to the heating element 12). In this manner, the input voltage to the spa (represented by Vs in FIGS. 5-6) may be regulated to adjust the output voltage to the heating element 12.

The variable resistor 42 may be used to control a thyristor (described below) in the variable voltage circuit 16. For example, the controller 18 may send a signal to increase resistance in the variable resistor 42 or decrease resistance in the variable resistor 42.

The variable voltage circuit 16 may also comprise a thyristor in electrical communication with the capacitor. The thyristor may comprise a solid-state semiconductor device with four layers of alternating P- and N-type materials to act as a bistable switch. The thyristor conducts when its gate receives the predetermined current trigger, and continues to conduct until the voltage across the device reverses. As shown in FIGS. 5-6, the current trigger is the voltage of the variable resistor minus the voltage of the capacitor.

Any suitable thyristor may be used in the variable voltage circuit 16. For example, silicon controlled thyristors, gate turn off thyristors, emitter turn off thyristors, reverse conducting thyristors, bidirectional triode thyristors, MOS turn off thyristors, bidirectional phase controlled thyristors, fast switching thyristors, light activated silicon controlled rectifiers, FET controlled thyristors, integrated gate commutated thyristors, breakover diodes, triode for alternating current, quadracs, etc.

In FIG. 5, the variable voltage circuit 16 includes a diac 48 which acts as a gate for a triac 52. The diac 48 is a two-junction bidirectional semiconductor device designed to break down when the AC voltage across it exceeds a certain level passing current in either direction. The diac 48 blocks the flow of current in both directions until the applied voltage is greater than the breakdown voltage or breakover voltage $V_{BR}$, at which point breakdown of the device occurs and the diac conducts heavily. In FIG. 5, the main terminal one (usually the anode) is labeled as MT2, and the main terminal two (usually the cathode) is labeled as MT1.

At the start of each cycle, the capacitor 44 charges via the variable resistor 42 until the voltage across the capacitor is sufficient to trigger the diac 48 into conduction. Once the diac 48 is conducting, the capacitor 44 discharges into the triac 52, and this sudden pulse of current fires the triac 52 into conduction. The phase angle at which the triac is triggered can be varied using the variable resistor 42, as the variable resistor 42 controls the charging rage of the capacitor.

The triac 52 may be configured to turn off automatically at the end of the half-cycle as the supply voltage falls to zero, reducing the current through the triac below its holding current, IH, and the diac stops conduction. The process of charging the capacitor via the variable resistor starts again at the next half-cycle.

As seen in FIG. 6, a quadrac 56 may also similarly be used to regulate voltage to the heating element 12. A quadrac may comprise a diac and triac fabricated together within a single semiconductor package; such quadracs are also known as "internally triggered triacs," The quadrac 56 may be a bi-directional device which is gate controlled using either polarity of the main terminal voltage. Thus, it may be used for full-wave phase-control applications such as the spa heating element. Like the triac, quadracs are a three-terminal semiconductor switching device labelled MT2 for main terminal one (usually the anode), MT1 for main terminal two (usually the cathode) and G for the gate terminal.

According to another aspect, the variable voltage circuit may comprise an integrated circuit with a switch-mode power supply. The power supply may be turned on and off at very high frequencies in order to control power to the heating element 12.

Settings selected or inputted by a user on the user interface 20 at the spa controller 18 may not only cause the spa controller 18 to implement such settings, but may also cause the network 38 to communicate such settings to a client device 40. In this manner, another spa user who is remote from the spa may be able to determine, in real-time, the settings on the spa controller 18. This may provide advantages such as increased energy efficiency, and improved ease of use of the spa.

Current spas may be retrofit; however, the spa heating system may also be used in all new manufactured spas as well. To retrofit a current spa, a kit may be provided that may include the variable voltage circuit to be hard-wired to a spa, as well as the controller 18.

Although the foregoing disclosure provides many specifics, such as use of the system in spas, it will be appreciated that pools and other user-controlled water holding devices are contemplated and these should not be construed as limiting the scope of any of the ensuing claims. Other embodiments may be devised which do not depart from the scopes of the claims. Features from different embodiments may be employed separately or in combination. Accordingly, all additions, deletions and modifications to the disclosed subject matter that fall within the scopes of the claims are to be embraced thereby. The scope of each claim is indicated and limited only by its plain language and the full scope of available legal equivalents to its elements.

As will be appreciated by a person having ordinary skill in the art, embodiments of the present invention, as described herein, may enable for enhanced systems. For example, embodiments of the present invention may increase efficiency of a system, reduce energy used by systems, increase safety of systems, and increase comfort levels of users.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

What is claimed:

1. A method for regulating an output voltage to a spa heating element from an input voltage to the spa heating element, comprising:
   providing a capacitor in electrical communication with the input voltage;
   providing a variable resistor in electrical communication with the capacitor and the spa heating element;
   providing a thyristor in electrical communication with the capacitor and the spa heating element;
   providing a controller in communication with the variable resistor;
   providing a thermistor in communication with the controller and the heating element;
   receiving, by the controller, at least one data point from a third party, the at least one data point relating to an ambient temperature proximal to the spa;
   receiving, by the controller, a signal from the thermistor indicating a current temperature of the heating element;
   receiving, by the controller, at least one heating pattern data point from a heating schedule module;
   receiving, by the controller, at least one current electricity pricing data point and at least one future electricity pricing data point from a third party;
   optimizing, by the controller, one or more signals to be sent to the variable resistor in response to the signal from the thermistor, the at least one heating pattern data point, the at least one current electricity pricing data point and the at least one future electricity pricing data point from the third party, and the at least one data point relating to the ambient temperature proximal to the spa; and
   sending, by the controller, the one or more signals to the variable resistor.

2. The method of claim 1, wherein the method further comprises providing a temperature probe in communication with the controller and water being heated by the heating element.

3. The method of claim 1, further comprising the step of providing a diac circuit with a predetermined breakover voltage in electrical communication with the capacitor; and wherein the thyristor is in electrical communication with the diac circuit and wherein the thyristor comprises a triac circuit.

4. The method of claim 1, wherein the thyristor comprises a quadrac circuit.

5. The method of claim 1, further comprising receiving, by the controller, a predetermined desired temperature from a client device.

6. The method of claim 1, further comprising the steps of:
   measuring a water flow past the spa heating element;
   sending a water flow signal representative of the water flow to the controller; and
   the controller automatically shutting off the spa heating element when the water flow signal is below a predetermined threshold.

7. A heating system for a spa comprising:
   a heating element;
   a thermistor, the thermistor in communication with the heating element and a controller;
   a capacitor in electrical communication with a voltage supply for the heating element;
   a variable resistor in electrical communication with the capacitor and the heating element, the variable resistor further in communication with the controller;
   a heating schedule module in communication with the controller, the heating schedule module comprising predictive heating pattern data; and
   the controller programmed to send a signal to the variable resistor in response to a heating element condition signal from the thermistor, a predictive heating pattern data signal from the heating schedule module, an ambient temperature proximal to the spa signal from a third party, and at least one current electricity pricing data point and at least one future electricity pricing data point from a third party.

8. The system of claim 7, wherein the heating element comprises the thermistor.

9. The system of claim 7, wherein system further comprises a temperature probe.

10. The system of claim 7, wherein the controller is programmed to change a resistance of the variable resistor in response to a heating instruction received at the controller.

11. The system of claim 7, further comprising a pressure sensor.

12. The system of claim 7, wherein the controller is in communication with a third party to receive data from the third party relating to ambient temperature proximal to the spa.

13. The system of claim 7, wherein the controller is programmed to store and analyze historical data relating to heating of the spa.

14. The system of claim 13, wherein the controller is programmed to determine an optimal heating temperature for the spa using the historical data relating to heating of the spa.

15. The spa heating system of claim 7, further comprising an integrated circuit configured to switch power mode supply at high frequencies, the integrated circuit in electrical communication with the capacitor and the heating element, the integrated circuit further in communication with the controller.

16. The system of claim 7, further comprising means for measuring water flow past the heating element.

17. The system of claim 16, wherein the heating element condition signal from the thermistor comprises data relating to a water flow rate past the heating element.

18. The system of claim 17, wherein the controller is further programmed to send a shut-off signal to the variable resistor in response to receiving a low water flow rate signal from the thermistor.

19. A kit for a heating system to a spa having an existing heating element, the kit comprising:
   a controller;
   a thermistor connected to the controller and having a connector for connection to the existing heating element;
   a capacitor configured for electrical communication with a voltage supply for the existing heating element;
   a variable resistor in electrical communication with the capacitor, the variable resistor further in communication with the controller;

at least one of a triac and a quadrac in electrical communication with the capacitor and the at least one of the triac and the quadrac configured for electrical communication to the existing heating element; and the controller programmed to send a signal to the variable resistor in response to a signal from the thermistor relating to a condition of the heating element, a signal from a heating schedule module relating to heating pattern data point, a signal from a third party comprising at least one data point relating to an ambient temperature proximal to the spa, and a signal from a third party relating to at least one current electricity pricing data point and at least one future electricity pricing data point.

* * * * *